Patented July 11, 1933

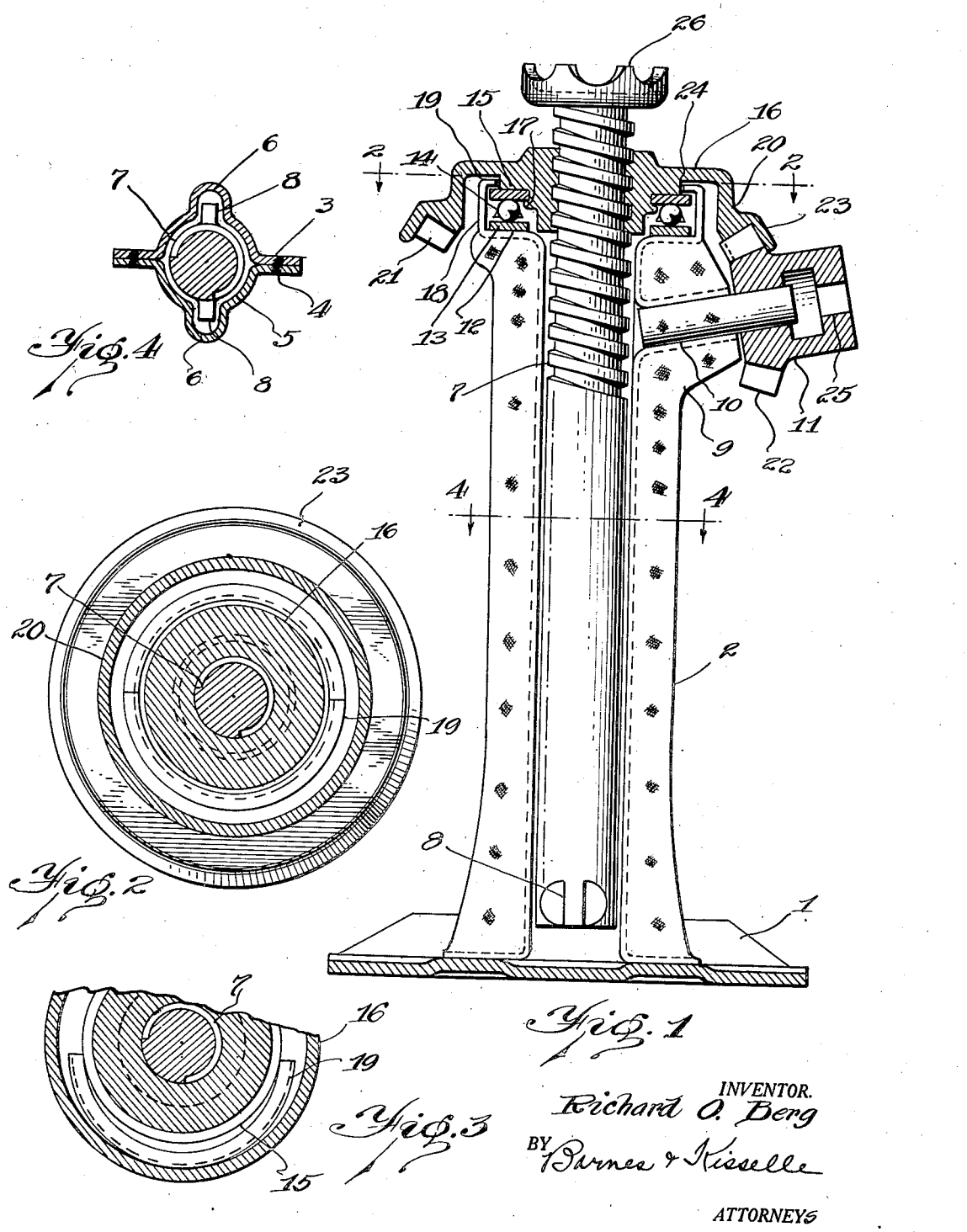

1,917,919

UNITED STATES PATENT OFFICE

RICHARD O. BERG, OF DETROIT, MICHIGAN, ASSIGNOR TO MICHIGAN STEEL TUBE PRODUCTS COMPANY, OF DETROIT, MICHIGAN, A CORPORATION OF MICHIGAN

SCREW JACK

Application filed September 21, 1931. Serial No. 564,031.

This invention relates to screw jacks and particularly to screw jacks as adapted for use with automobiles.

The principal object of the invention is to provide a jack of simple construction so designed that bolts and screws are completely eliminated. This is accomplished by forming a standard of sheet steel which is composed of a base and two vertical sections welded together. The standard is so designed that when it is assembled it locks the bevel gear and pinion in position, no pins nor keys being necessary for this purpose. Thus, the number of parts is reduced to a minimum. A further advantage of this invention is that the ball bearings which carry the thrust of the jack are completely enclosed and protected from dirt. The teeth of the bevel gear are also protected from breakage by a flange.

One embodiment of this invention is shown in the accompanying drawing:

Fig. 1 is a side elevation of the jack showing a part cut away and the bevel gear ball race and pinion in section.

Fig. 2 is a horizontal section along the line 2—2 of Fig. 1.

Fig. 3 is also a horizontal section along the line 2—2 of Fig. 1 showing the manner of assemblying the jack.

Fig. 4 is a horizontal section along the line 4—4 of Fig. 1.

Referring to the drawing, 1 represents the base of the jack having raised edges and ridges to increase the strength formed of a sheet metal stamping. The standard is referred to generally as 2. It is composed of two sheet metal stampings 3 and 4 spot welded together. The cross-section of the two stampings, as will be seen in Fig. 4, is irregular which gives increased strength to the standard. The two members 3 and 4 have at their lower ends a flange extending perpendicularly. These two members are secured to the base by spot welding the flanges to the base.

As may be further observed from Fig. 4 the cross-section of the standard 2 is circular in form, that is, the members 3 and 4 form a cylinder 5 longitudinally of the standard with the exception that two U-shaped grooves 6, longitudinally of the standard, are formed by the contour of the stampings 3 and 4.

The screw 7 is positioned within the cylinder 5 and is capable of free movement axially of the cylinder. At the lower end of the screw are two lugs 8 which are formed on diametrically opposite sides of the screw preferably by swedging. These lugs are made of such size as to fit into the U-shaped grooves 6 permitting free longitudinal movement. Inasmuch as the grooves 6 extend the full length of the standard 2 the screw 7 is prevented from rotating no matter what the position the screw is in since the lugs bear against the sides of the U-shaped grooves.

The stampings 3 and 4, close to their upper ends, are formed with complementally semi-circular grooves resulting, when the members 3 and 4 are welded together, in a circular socket extending in a direction substantially perpendicular to the standard. The circular pin 10 is positioned within the circular socket with one end close to the interior wall of the standard and the other end extending beyond the standard as may be seen in Fig. 1. The pin 10 is welded to the standard so that it is incapable of any movement. The pinion 11 is rotatably carried by the portion of the pin 10 which extends outside the standard. This pinion is held in place by a means which will be explained later.

The standard is constructed at its upper end so that a horizontal circular surface is formed concentric with the longitudinal cylinder 5. The diameter of the surface 12 is approximately three times the diameter of the cylinder 5. This shelf-like surface 12 supports a circular ring 13 which serves as the lower portion of a ball race. Ball bearings 14 are enclosed by the circular ring 13 and a similar ring 15 forming the upper half of the ball race. The bevel gear 16 is a casting internally threaded to engage the screw 7.

The upper ring 15 is fixed to the bevel gear 16 preferably by peening or upsetting the lower portion of the bevel gear as at 17 or by riveting. Enclosing the ball race is the upper portion of the standard forming a cylinder 18 concentric with the cylinder 5 having an inwardly projecting flange 19. This flange by fitting into the groove 24 holds the bevel gear in place. That is, it prevents an axial movement of the gear so that no keys or pins are necessary for that purpose since the ring 15 is rigidly secured to the bevel gear.

In the claims at some places the gear is referred to as having an annular groove. Specifically in the structure shown in the drawing, this groove 24 is formed by the gear per se and the upper ball race which is attached to it. I therefore consider this whole unit in a sense a gear but it is obvious that the groove might be in the gear hub itself and the ball race separate and I do not want to be limited to the ball race forming part of the groove except where I have so specifically stated in the claims.

The bevel gear has a downwardly projecting flange 20 which is inclined slightly outward at its lower edge. The teeth 21 of the gear are located in this outwardly projecting portion so as to intermesh with the teeth 22 of the pinion. The flange 23 of the bevel gear prevents axial movement of the pinion and thus the latter is held in position without the aid of keys or pins. As has been explained, the jack is built without bolts or screws of any sort. This advantage is obtained by the interlocking of the several parts. The pinion 11 is held in position by the flange of the bevel gear and the bevel gear by the flange of the standard.

The method of assemblying this jack is one of the most important features to be considered, since it is the combination of this method with the parts of new design which results in a jack of such simple construction. The first step is threading the bevel gear 16 on the screw 7 and fixing the plate 26 to the upper end of the screw 7 preferably by upsetting the end of the screw. The manner of assemblying the bevel gear within the standard is shown in Fig. 3. The bevel gear is placed so that the flange 19 of one of the members forming the standard, is made to fit into the space between the ball race 15 and the flange 20 of the bevel gear. The flange 19 may then be inserted into the groove 24. The pinion 11 may then be placed on the pin 10 which is then inserted in the transverse groove of the member of the standard so that the pinion 11 assumes its designated position in engagement with the bevel gear and held in place by the flange 23. The remaining member of the standard may then be placed in its proper position so as to interlock with the bevel gear, by following the same steps that were necessary to assemble the first member and the bevel gear. When the two members 3 and 4 are brought together they may be spot welded to each other. The base may then be welded to the standard. When the jack is in use the pressure exerted upon the horizontal surface 12 may become considerable. Hence, it is advisable to weld the two members 3 and 4 together at more places toward the top of the standard than at the bottom. A jack is formed in this manner which is of a very simple and rugged construction and which is permanent. It should be understood, however, that the order in which the steps of the assembly are carried out may be readily varied without in any way affecting the finished product.

The operation of the jack is very simple. A crank of the ordinary sort may be inserted into the square opening 25 of the pinion. The turning of this crank causes the bevel gear to rotate and the screw to move axially without turning, thus raising or lowering the plate 26.

I claim:

1. A jack comprising a hollow standard which includes two matched halves, said jack adapted to be assembled by the securing together of the matched standard halves, a lifting screw in the hollow standard, a gear member threaded onto the lifting screw, means forming a circular groove in the gear substantially concentric with its axis, each half of the standard having a supporting surface near its upper end, anti-friction elements disposed between the gear and the supporting surfaces and adapted to take the lifting thrust, each standard half having means integral therewith and projecting above the anti-friction elements, the upper edge portions of said means being angularly disposed and fitting into the said circular groove in the gear whereby all of said parts are held in assembly by the securing together of the two matched standard halves.

2. A jack comprising a hollow standard which includes two matched halves, said jack adapted to be assembled by the securing together of the matched standard halves, a lifting screw in the hollow standard, a gear member threaded onto the lifting screw, means forming a circular groove in the gear substantially concentric with its axis, each half of the standard having a supporting surface near its upper end, anti-friction elements disposed between the gear and the supporting surfaces and adapted to take the lifting thrust, each standard half having a semi-circular flange rising above the supporting surface, each semi-circular flange having edge portions fashioned inwardly, said edge portions fitting into the groove in the gear and the semi-circular flanges cooperating to form a housing wall surrounding the anti-friction elements, all of said parts being held in assembly by the securing together of the two matched halves of the standard.

3. A jack comprising a hollow standard which includes two matched halves, said jack adapted to be assembled by the securing together of the matched standard halves, a lifting screw in the hollow standard, a gear member threaded onto the lifting screw, means forming a circular groove in the gear substantially concentric with its axis, each half of the standard having a supporting surface near its upper end, anti-friction elements disposed between the gear and the supporting surfaces and adapted to take the lifting thrust, each standard half having means integral therewith and projecting above the anti-friction elements, the upper edge portions of said means being angularly disposed and fitting into the said circular groove in the gear whereby all of said parts are held in assembly by the securing together of the two matched standard halves, and said matched standard halves being welded together.

4. A jack comprising a hollow standard which includes two matched halves, said jack adapted to be assembled by the securing together of the matched standard halves, a lifting screw in the hollow standard, a gear member threaded onto the lifting screw, means forming a circular groove in the gear substantially concentric with its axis, each half of the standard having a supporting surface near its upper end, anti-friction elements disposed between the gear and the supporting surfaces and adapted to take the lifting thrust, each standard half having means integral therewith and projecting above the anti-friction elements, the upper edge portions of said means being angularly disposed and fitting into the said circular groove in the gear, said standard having a socket, a pin supported in the socket with one end projecting therefrom, a pinion for operating the gear carried by the projecting end of the pin, interengaging means between the pinion and gear comprising a flange on one overlying part of the other for holding the pinion from axial movement, whereby all of said parts are held in assembly by the securing together of the two matched standard halves.

5. A jack comprising a hollow standard which includes two matched halves, said jack adapted to be assembled by the securing together of the matched standard halves, a lifting screw in the hollow standard, a gear member threaded onto the lifting screw, means forming a circular groove in the gear substantially concentric with its axis, each half of the standard having a supporting surface near its upper end, said supporting surfaces taking the lifting thrust of the gear, means on each standard half having inwardly fashioned portions fitting into the circular groove in the gear, a socket in the standard, a pin carried thereby and projecting therefrom, a gear operating pinion mounted on the projecting end of the pin, interengaging means between the gear and pinion comprising a flange on one overlying a part of the other for holding the pinion from axial movement, and said matched halves being secured together whereby the gear and screw are held in assembly by the inwardly fashioned means positioned in said groove and whereby the pinion is held in assembly by the gear.

6. A jack comprising a hollow standard which includes two matched halves, said jack adapted to be assembled by the securing together of the matched standard halves, a lifting screw in the hollow standard, a gear member threaded onto the lifting screw, means forming a circular groove in the gear substantially concentric with its axis, each half of the standard having a supporting surface near its upper end, said supporting surfaces taking the lifting thrust of the gear, means on each standard half having inwardly fashioned portions fitting into the circular groove in the gear, a socket in the standard formed by matching semi-circular portions of the standard halves, a stud situated in the socket and projecting therefrom, a pinion rotatably mounted on the stud for actuating the gear, cooperating means between the gear and pinion comprising a flange on one overlying a part of the other for holding the pinion from movement axially, said standard halves being welded together and the stud being welded into its socket, whereby all of said parts are held in assembly.

7. A jack comprising a hollow standard which includes two matched halves, said jack adapted to be assembled by the securing together of the matched standard halves, a lifting screw in the hollow standard, a gear member threaded onto the lifting screw, each standard half having near its upper end a supporting surface, an anti-friction bearing between the gear and the supporting surfaces for taking the lifting thrust and having a race member for directly supporting the gear, means fixedly uniting said race member to the gear, said race member projecting outwardly of the hub portion of the gear thereby forming a circular groove, means on each standard half projecting upwardly from the supporting surface and having inwardly fashioned edge portions located in said groove, whereby said race member serves as a holding ring for retaining the gear in position, a pinion for operating the gear, means for mounting the same, cooperating means between the gear and pinion comprising a flange on one overlying a part of the other so that the gear holds the pinion from axial movement, and said standard halves being secured together whereby all of said parts are held in assembly.

8. A jack comprising in combination, a standard including two matching halves, the upper ends of the halves each having a load supporting surface, each half having a flange projecting upwardly above its supporting surface, each flange having an upper edge portion fashioned inwardly and located in predetermined spaced relation with respect to said load supporting surface to accommodate an anti-friction thrust bearing, a lifting screw, a rotatable gear having a hub threaded on the screw, said hub having a portion projecting radially outwardly to form a ledge, and anti-friction bearing elements between the supporting surfaces of the halves of the standard and a portion of the gear, and adapted to take the lifting thrust, said halves of the standard being adapted to be brought together with the said inwardly fashioned edge portions passing freely over the said ledge to hold the gear in assembly, whereby the gear may have free rotary movement, and whereby there is freedom of action of the anti-friction elements.

9. A jack comprising in combination, a standard including two matching halves, the upper ends of the halves each having a load supporting surface, each half having a flange projecting upwardly above its supporting surface, each flange having an upper edge portion fashioned inwardly and located in predetermined spaced relation with respect to said load supporting surface to accommodate an anti-friction thrust bearing, a lifting screw, a rotatable gear having a hub threaded on the screw, said hub having a portion projecting radially outwardly to form a ledge, and anti-friction bearing elements between the supporting surfaces of the halves of the standard and a portion of the gear, and adapted to take the lifting thrust, said halves of the standard being adapted to be brought together with the said inwardly fashioned edge portions passing freely over the said ledge to hold the gear in assembly, whereby the gear may have free rotary movement, and whereby there is freedom of action of the anti-friction elements, said upwardly projecting flange each being of semi-circular formation and adapted to match and form a full circular housing for confining the anti-friction elements.

10. A jack comprising in combination, a standard including two matching halves, the upper ends of the halves each having a load supporting surface, each half having a flange projecting upwardly above its supporting surface, each flange having an upper edge portion fashioned inwardly and located in a predetermined spaced relation as regards the supporting surface, whereby a space of determined dimension between the suporting surfaces and the inwardly fashioned portions is provided for accommodating an anti-friction bearing, a lifting screw, a rotatable gear having a hub threaded on the screw, said hub having a part of relatively small diameter and a part of relatively large diameter to provide a shoulder between said parts, a race ring for anti-friction elements positioned over the part of small diameter and butting against the shoulder, said race ring being fixedly united to the gear and having an outside diameter greater than that of the hub part with the relatively large diameter whereby to project radially outwardly therefrom, another race ring on the supporting surfaces of the standard halves, and anti-friction elements between the two race rings adapted to take the lifting thrust, said standard halves being adapted to be brought together with the said inwardly fashioned edge portions passing freely over the projecting portion of the first mentioned race ring to hold the gear and anti-friction elements in assembly, whereby the gear may have free rotary movement and whereby there is freedom of action of the anti-friction elements.

In testimony whereof I affix my signature.

RICHARD O. BERG.